Figure 1:
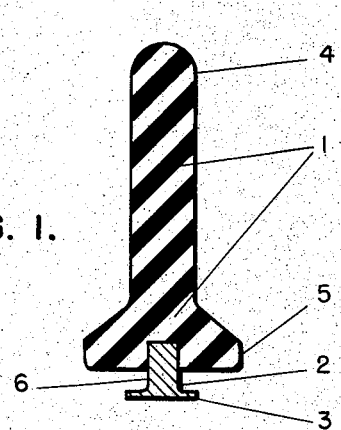

June 1, 1954  H. SHAW ET AL  2,680,093
ANODE-SUPPORTING MEANS FOR MERCURY CELLS
Filed Feb. 5, 1951

Inventors
HARRY SHAW
ALBERT THOMPSON
PETER ALEXANDER WOOD

Cushman, Darby & Cushman
Attorneys

Patented June 1, 1954

2,680,093

UNITED STATES PATENT OFFICE 2,680,093

ANODE-SUPPORTING MEANS FOR MERCURY CELLS

Harry Shaw, Albert Thompson, and Peter A. Wood, Runcorn, England, assignors to Imperial Chemical Industries Limited, a corporation of Great Britain Application February 5, 1951, Serial No. 209,346

Claims priority, application Great Britain February 7, 1950

5 Claims. (Cl. 204—219)

The present invention relates to means for the automatic and continuous re-adjustment of the inter-electrode space in a mercury cell and is an improvement in or modification of the invention according to United States Patent No. 2,596,583, May 13, 1952.

In the specification of the said patent there is described a means of automatic and continuous re-adjustment of the inter-electrode space in a mercury cell of the flowing cathode type, which means comprises a series of relatively small insulating bodies resting on the cell bottom and so shaped as to make only linear contact with the anodes, which anodes may be modified to secure the required linear contact and convenient positioning of the supporting bodies.

It has been observed that when operating the invention described in the foregoing over prolonged periods, an effect may occur where the base of the supporting body rests on the bottom of the cell. If the brine is impure, for example if it contains appreciable amounts of calcium salts, calcareous deposits may grow upon that part of the supporting body which is normally below the amalgam level. These deposits may also grow on the cell bottom. On other occasions, when a metallic cell bottom is used corrosion of the bottom may occur.

We have now found that corrosion of the cell base and the growth thereon of deposits from impure brine are substantially eliminated when there is located between each of the insulating anode-supporting bodies and the cell base-plate a relatively small body of metal which is capable of being wetted by the cathodic mercury, the said metallic body being attached to the anode-supporting body.

According to the present invention an electrode assembly suitable for use in electrolytic cells comprises a mass or masses of electrically conducting material substantially supported within the cell by means of a series of relatively small bodies made of insulating material and so shaped as to make contact, edge-surface only with the mass or masses constituting the supported electrode there being located between each of the insulated anode-supporting bodies and the cell base-plate a relatively small body of metal which is capable of being wetted by the cathodic mercury the said metallic body being attached to the anode supporting body and itself resting on the base-plate of the cell.

Although no theory is advanced as to the manner in which the invention operates, it is probable that the formation of a region of intimate amalgamated contact between the base-plate of the cell and the base of the non-conducting and non-amalgamating anode-supporting body excludes deposit or corrosion-promoting agencies from the base-plate.

In a preferred form of the invention the metallic body below the base of the anode-supporting body is made of steel and is in the form of a cylindrical stem vertically fixed into the base of the anode-supporting body, provided with a disc-shaped extremity the under-face of which rests on the base-plate of the electrolytic cell. The degree of projection of the steel inset below the base of the anode-supporting body should be approximately half the depth of the cathodic mercury on the cell base-plate.

In another embodiment of the invention the small metallic body is a steel cylinder of diameter considerably smaller than that of the anode-supporting body's base, the plane end of the said cylinder resting on the base-plate of the cell.

A wide variety of forms of the small metallic body is envisaged, all of which have as their principal features a plane surface at the lower extremity and a stem or body of such dimensions that, when the metallic body is in position below the anode-supporting body, the said plane surface is remote from the base of the anode-supporting body by a distance less than the depth of the mercury of the flowing cathode of the cell. The upper part of the stem of the inset may be a push-fit into a cavity provided in the anode-supporting body, or it may be screwed into position, or held by cement.

Figure 3:
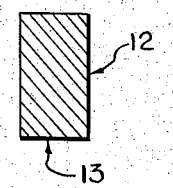

The accompanying drawings illustrate diagrammatically, and by way of example a suitable embodiment of the invention. Figure 1 is a vertical section and Figure 1A a plan of one suitable form of anode supporting body affixed to a supporting metal body. Figure 2 is a vertical section illustrating the anode supporting bodies and the supporting metal pegs in the form shown in Figure 1 and located in position in the cavities of the anodes. Figure 3 is a vertical section of a modified form of the supporting metal body.

In Figure 1, 1 is the anode supporting body and 2 is the supporting metal body. 4 is the circular stem of the anode supporting body conveniently of the order of four times the height of the base 5.

2 is the small metal supporting body having a stem 6 protruding into a cavity in the anode supporting body. The disc shaped base 3 of the metal supporting body or peg 2 rests on the base plate of the cell.

Figure 1A:
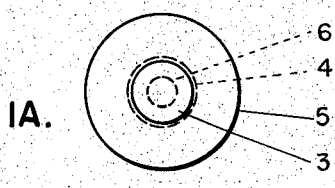
Figure 2:
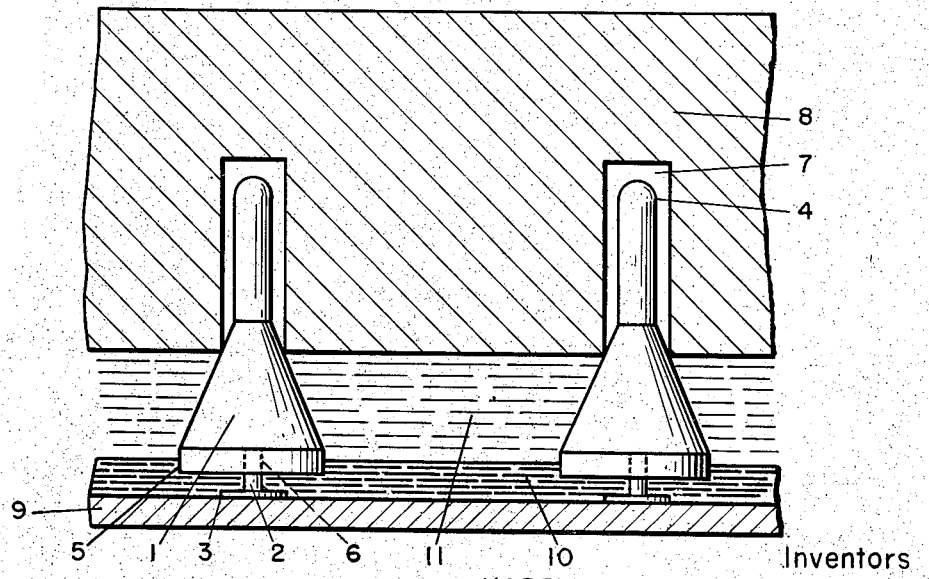

In Figure 1A, the numbered elements correspond to the like numbered elements of Figure 1.

In Figure 2 the stem 6 of each of the supporting bodies 2 protrudes into a circular hole 7 in the anode mass 8.

Figure 3 illustrates a modified form of the supporting metal body wherein a steel cylinder 12 of diameter considerably less than that of the base of the anode supporting body is utilized. The base 13 of the cylinder rests on the base plate of the cell.

Resting on the cell bottom are the metal supporting bodies or pegs the under surfaces of the lower disc shaped portions of the pegs making contact with the cell bottom while the upper portion or stem partly protrudes into a cavity at the base of the anode supporting bodies and may be push fitted or screwed into the appropriate positions.

The appropriate position is such that the lower part of each of the stems 6, that is that portion of each stem which is below the base of the anode supporting body is approximately half the depth of the cathode mercury. The cell bottom 9 carries the mercury cathode 10, between which and the anode 8 flows the electrolyte 11.

It must be understood that the embodiment of the invention disclosed in the drawings is illustrative only and that the invention may be embodied in other ways compatible with the appended claims.

Having now particularly described and ascertained the nature of our said invention, and in what manner the same is to be performed, we declare that what we claim is:

1. In an electrolytic cell of the flowing mercury cathode type having a base plate for supporting the flowing mercury cathode, an electrode assembly providing for the automatic and continuous re-adjustment of the inter-electrode space in the said cell and comprising an anode having a plane undersurface substantially parallel to said base plate, relatively small bodies made of insulating material having a conical upper surface in contact with said plane undersurface and supporting said anode within the cell, and relatively small bodies of metal capable of being wetted by the cathodic mercury located between each of the insulating anode-supporting bodies and the said base plate, each of said small bodies of metal being attached to an anode supporting body and itself resting on the said base plate and spacing the insulating body from the base plate.

2. An electrolytic cell as claimed in claim 1 in which the lower extremity of each of the small bodies of metal below the anode supporting bodies is in the shape of a disc, the undersurface of which rests on the base plate of the electrolytic cell.

3. An electrolytic cell as claimed in claim 1 in which each of the small bodies of metal below the anode supporting bodies is made of steel.

4. An electrolytic cell as claimed in claim 1 in which each of the anode supporting bodies has a flat base substantially parallel to the base plate and in which each of the small metallic bodies is a steel cylinder of diameter considerably less than that of the base of the anode supporting bodies, the plane end of the cylinder resting on the base plate of the cell.

5. An electrolytic cell as claimed in claim 1 in which the upper extremity of each of the small bodies of metal below the anode supporting bodies is in the shape of a stem and the upper portion of said stem is inset and push-fitted into a cavity provided in the anode supporting bodies.

References Cited in the file of this patent

UNITED STATES PATENTS

| Number | Name | Date |
| --- | --- | --- |
| 1,360,545 | Levin | Nov. 30, 1920 |
| 1,481,648 | Levin | Jan. 22, 1924 |
| 2,596,583 | Mieklejohn | May 13, 1952 |

OTHER REFERENCES

"Horizontal Mercury Chlorine Cell" FIAT Report No. 816, May 15, 1946, pages 14, 18 and 21. Office of Technical Services, U. S. Dept. of Commerce, Washington, D. C.